(No Model.)  9 Sheets—Sheet 1.

A. RECKENZAUN.
ELECTRIC METER.

No. 503,805. Patented Aug. 22, 1893.

Attest:
F. H. Schott
Alfred T. Gage.

Inventor:
Anthony Reckenzaun
by R. F. Kurlman,
Attorney.

(No Model.) 9 Sheets—Sheet 2.

A. RECKENZAUN.
ELECTRIC METER.

No. 503,805. Patented Aug. 22, 1893.

Attest:
F. H. Schott
Alfred T. Gage

Inventor:
Anthony Reckenzaun
by R. T. Studman
Attorney (No Model.) 9 Sheets—Sheet 3.

A. RECKENZAUN.
ELECTRIC METER.

No. 503,805. Patented Aug. 22, 1893.

Attest:
F. H. Schott
Alfred T. Gage.

Inventor:
Anthony Reckenzaun
by W. D. Henderson
Attorney (No Model.) 9 Sheets—Sheet 4.
A. RECKENZAUN.
ELECTRIC METER.

No. 503,805. Patented Aug. 22, 1893.

Attest:
H. H. Schott
Alfred T. Gage

Inventor
Anthony Reckenzaun
by H. D. Henderson
Attorney (No Model.)  A. RECKENZAUN.  9 Sheets—Sheet 5.
ELECTRIC METER.
No. 503,805.  Patented Aug. 22, 1893.

Attest:
F. H. Schott
Alfred T. Gage.

Inventor:
Anthony Reckenzaun
by H. D. Henderson
Attorney.

(No Model.) 9 Sheets—Sheet 6.

A. RECKENZAUN.
ELECTRIC METER.

No. 503,805. Patented Aug. 22, 1893.

(No Model.) 9 Sheets—Sheet 7.
A. RECKENZAUN.
ELECTRIC METER.

No. 503,805. Patented Aug. 22, 1893.

Attest:
F. H. Schott
Alfred T. Gage.

Inventor
Anthony Reckenzaun
by R. Henderson, Attorney.

(No Model.)  A. RECKENZAUN.  9 Sheets—Sheet 8.
ELECTRIC METER.

No. 503,805.  Patented Aug. 22, 1893.

Attest:
F. H. Schott
Alfred T. Gage.

Inventor:
Anthony Reckenzaun
Attorney.

(No Model.)

A. RECKENZAUN.
ELECTRIC METER.

No. 503,805. Patented Aug. 22, 1893.

Attest:
F. H. Schott
Alfred T. Gage.

Inventor:
Anthony Reckenzaun
by H. Hendman,
Attorney

UNITED STATES PATENT OFFICE.

ANTHONY RECKENZAUN, OF LONDON, ENGLAND, ASSIGNOR TO JAMES A. PENTZ, OF PHILADELPHIA, PENNSYLVANIA.

ELECTRIC METER.

SPECIFICATION forming part of Letters Patent No. 503,805, dated August 22, 1893.

Application filed November 26, 1892. Serial No. 453,232. (No model.) Patented in England August 20, 1891, No. 14,089.

*To all whom it may concern:*

Be it known that I, ANTHONY RECKENZAUN, of the city of London, England, and a subject of the Queen of Great Britain, residing at Stockwell, in the county of Surrey, England, have invented certain new and useful Improvements in Electric Meters, (for which I have obtained a patent in Great Britain, No. 14,089, dated August 20, 1891;) and I do declare the following to be a full, clear, and exact description of the invention, such as will enable others skilled in the art to which it appertains to make and use the same, reference being had to the accompanying drawings, and to the figures of reference marked thereon, which form a part of this specification, and in which—

Figure 1:
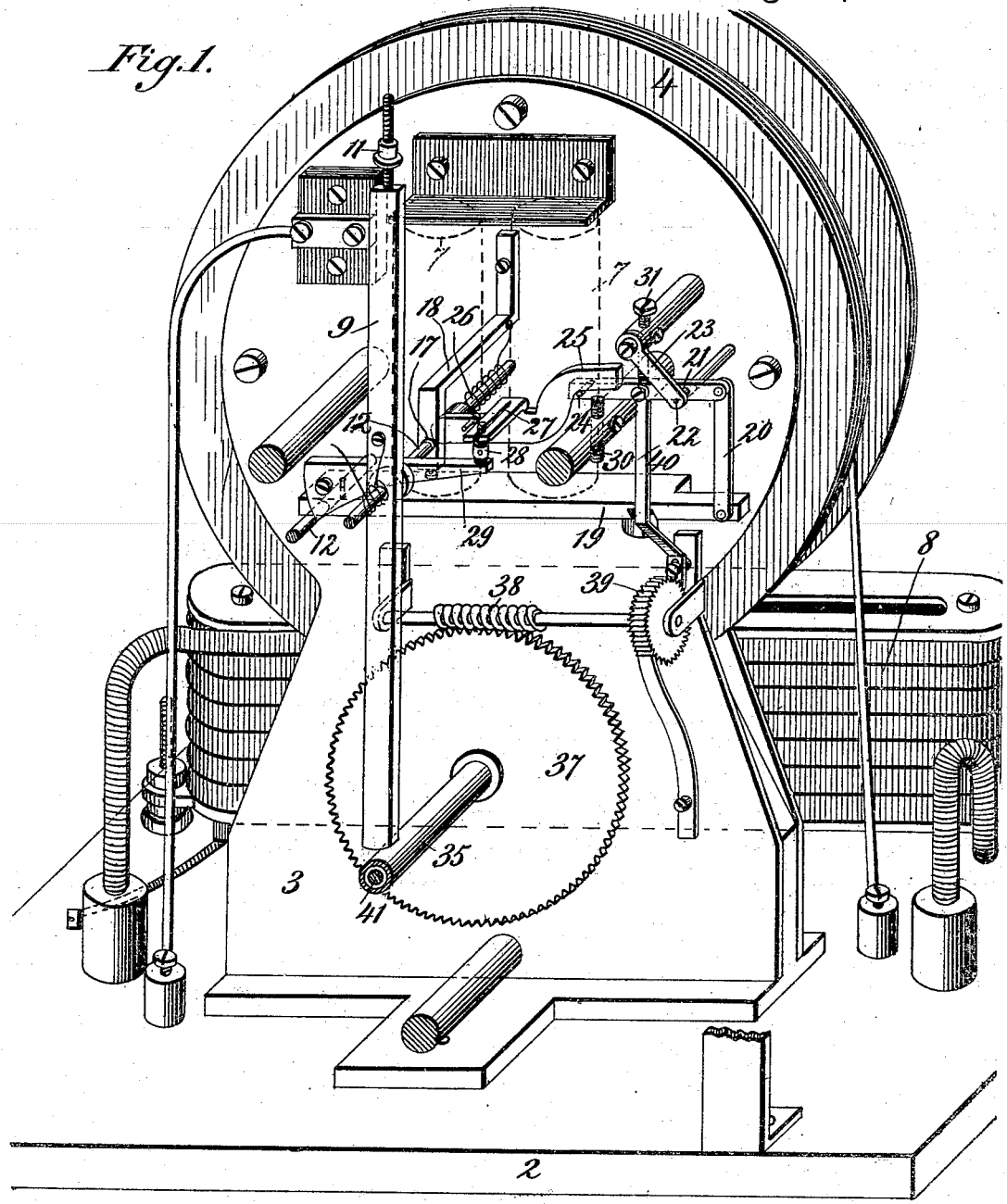
Figure 2:
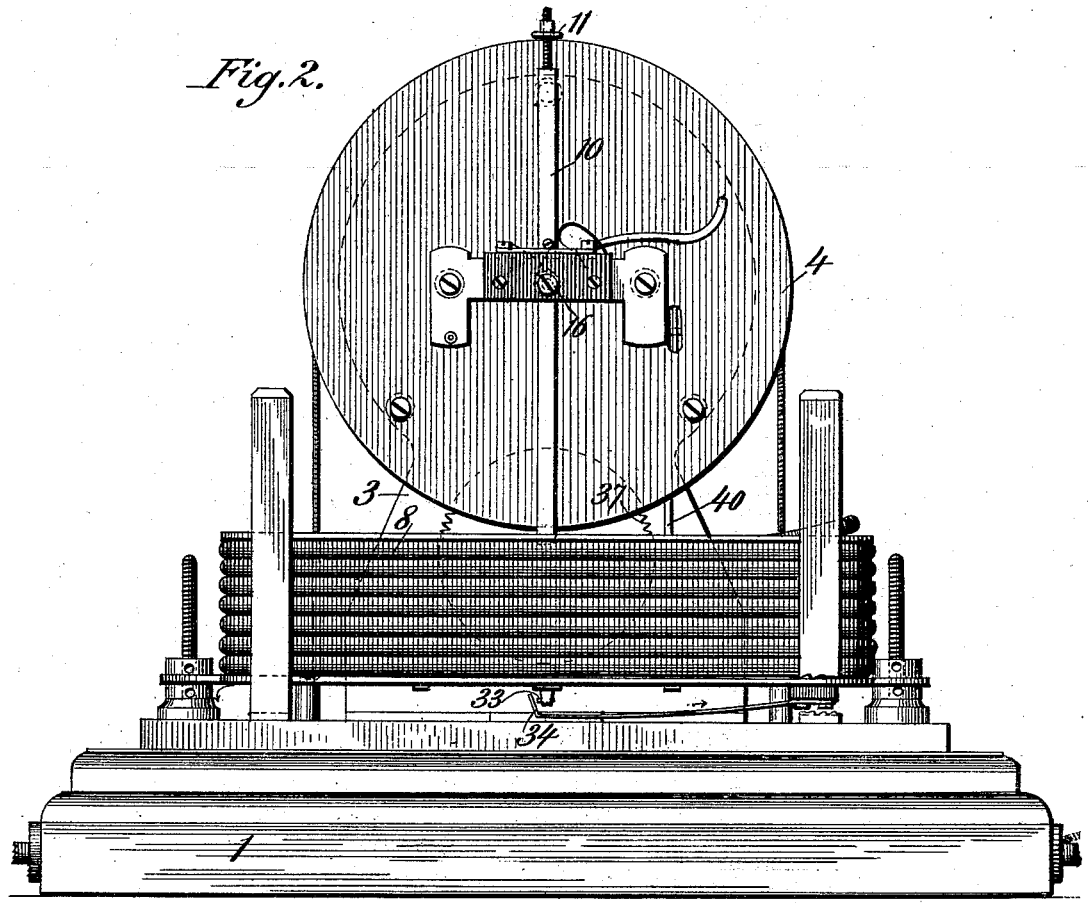
Figure 3:
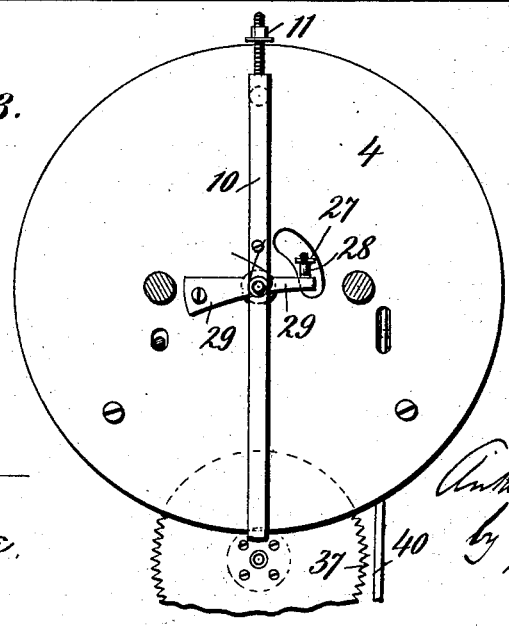
Figure 4:
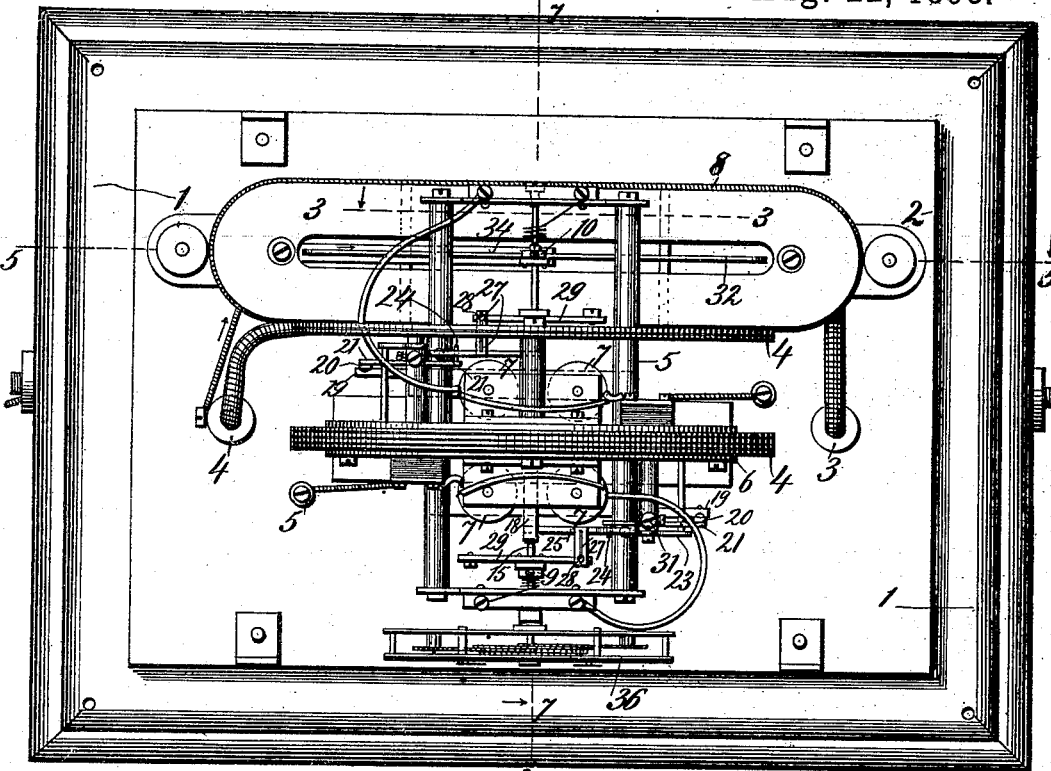
Figure 5:
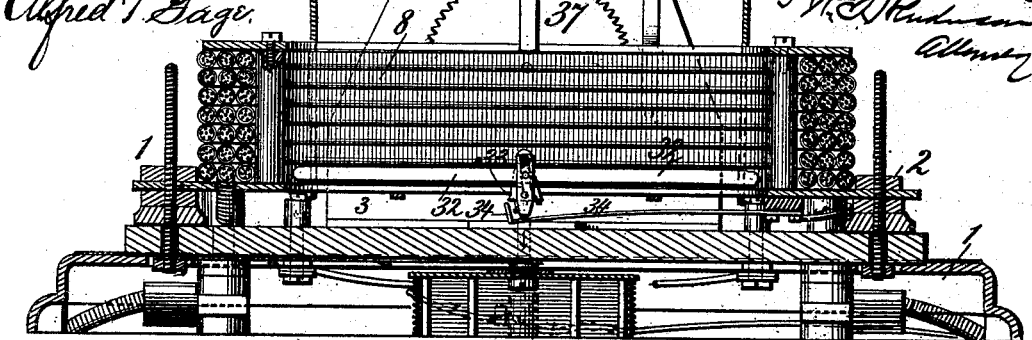
Figure 6:
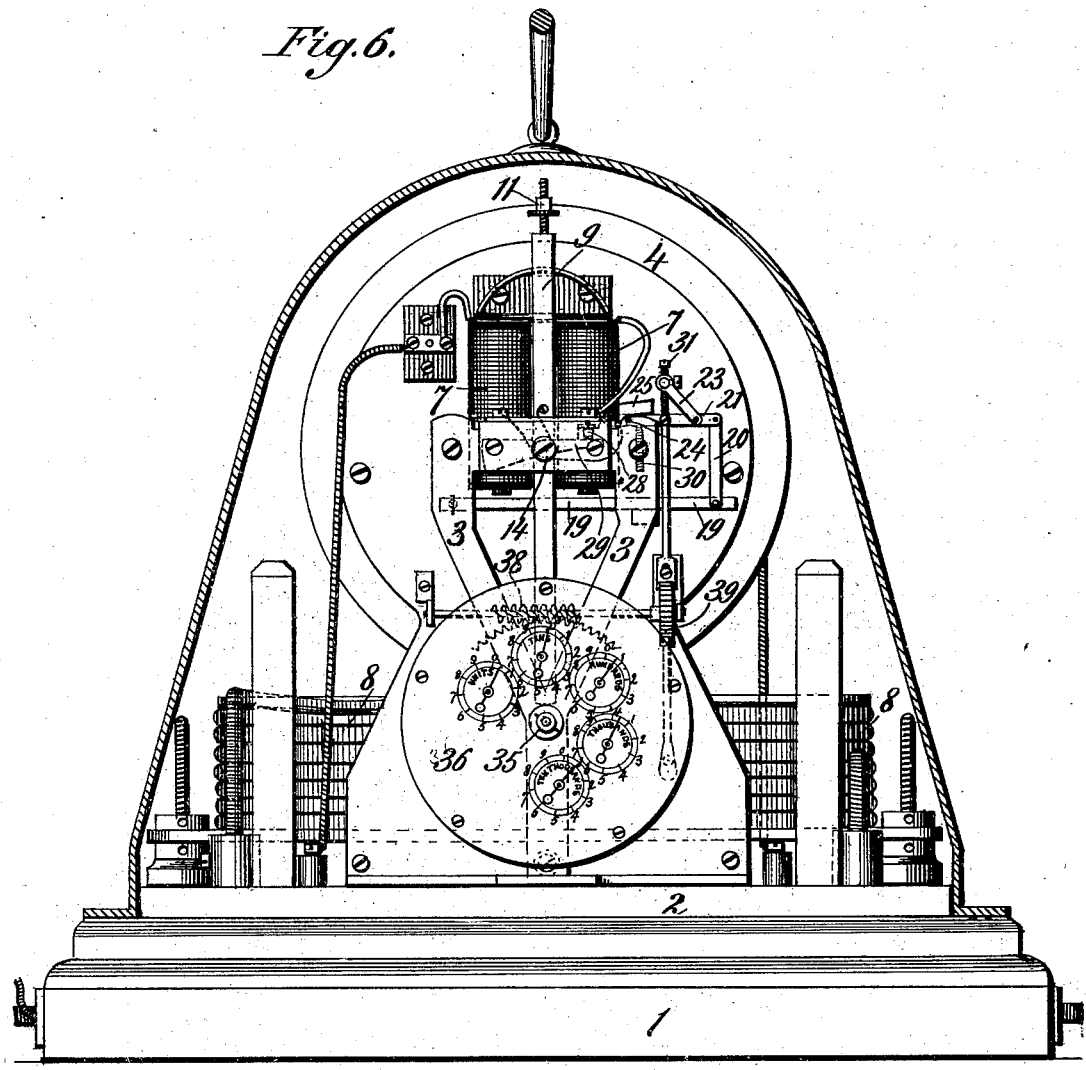
Figure 7:
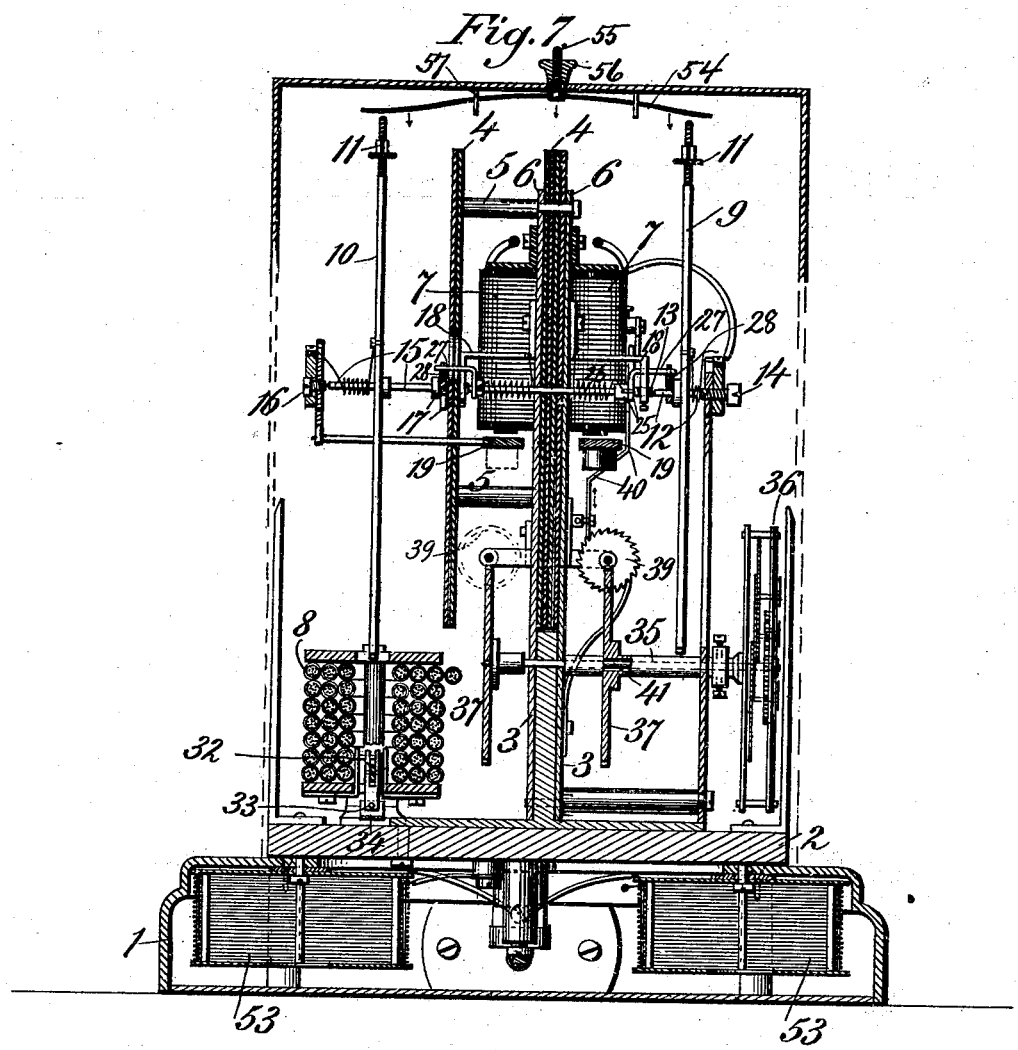
Figure 8:
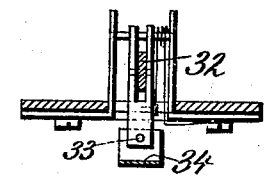
Figure 9:
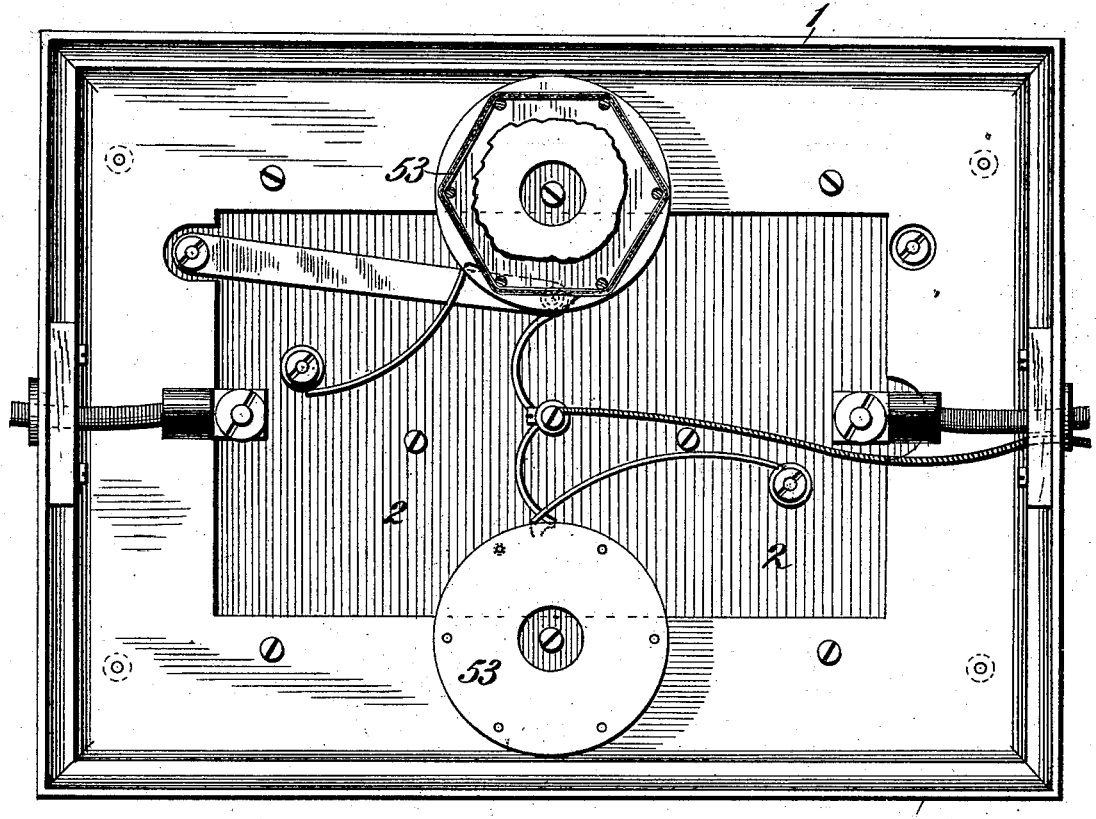
Figures 10, 11:
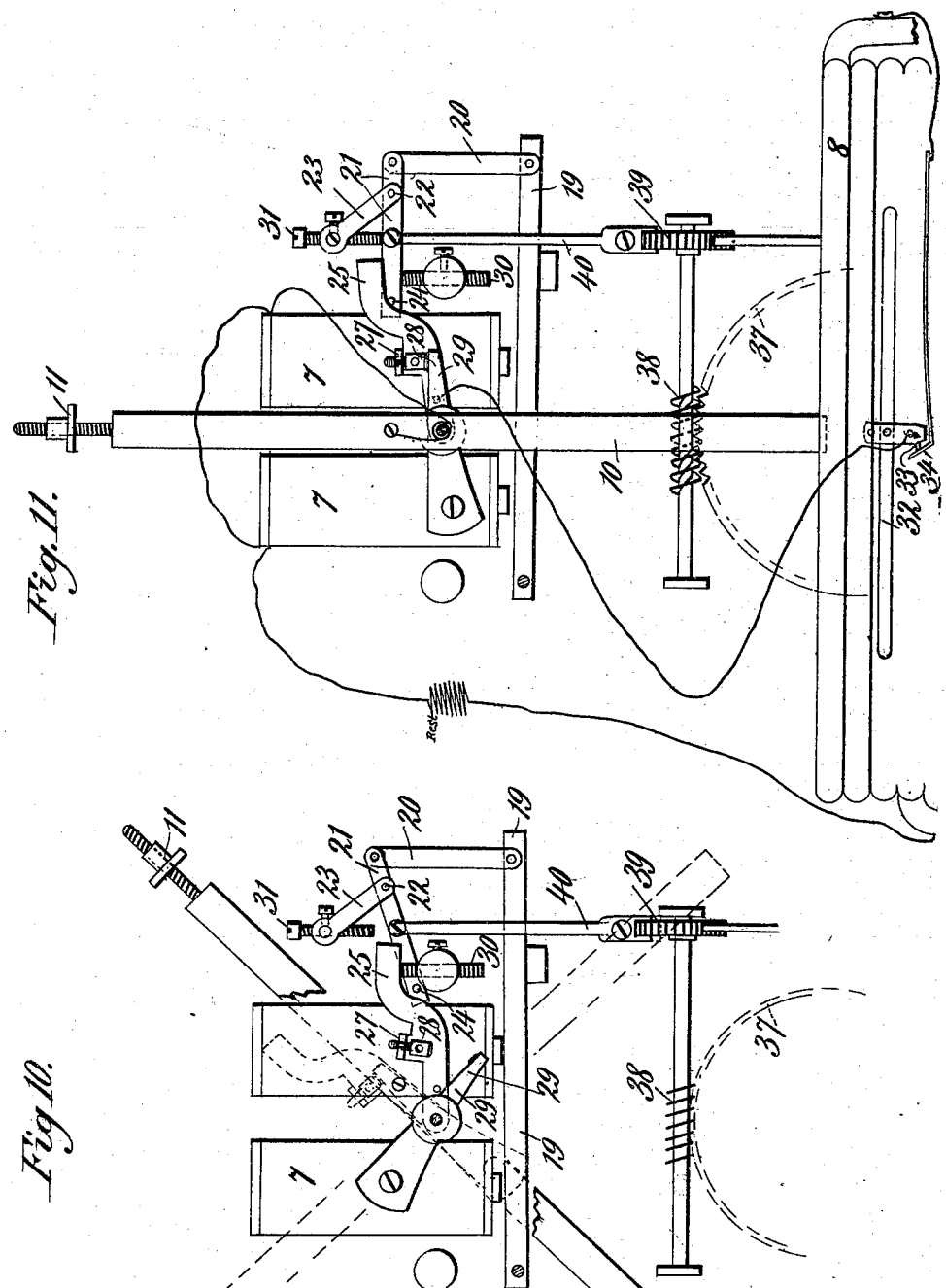
Figure 12:
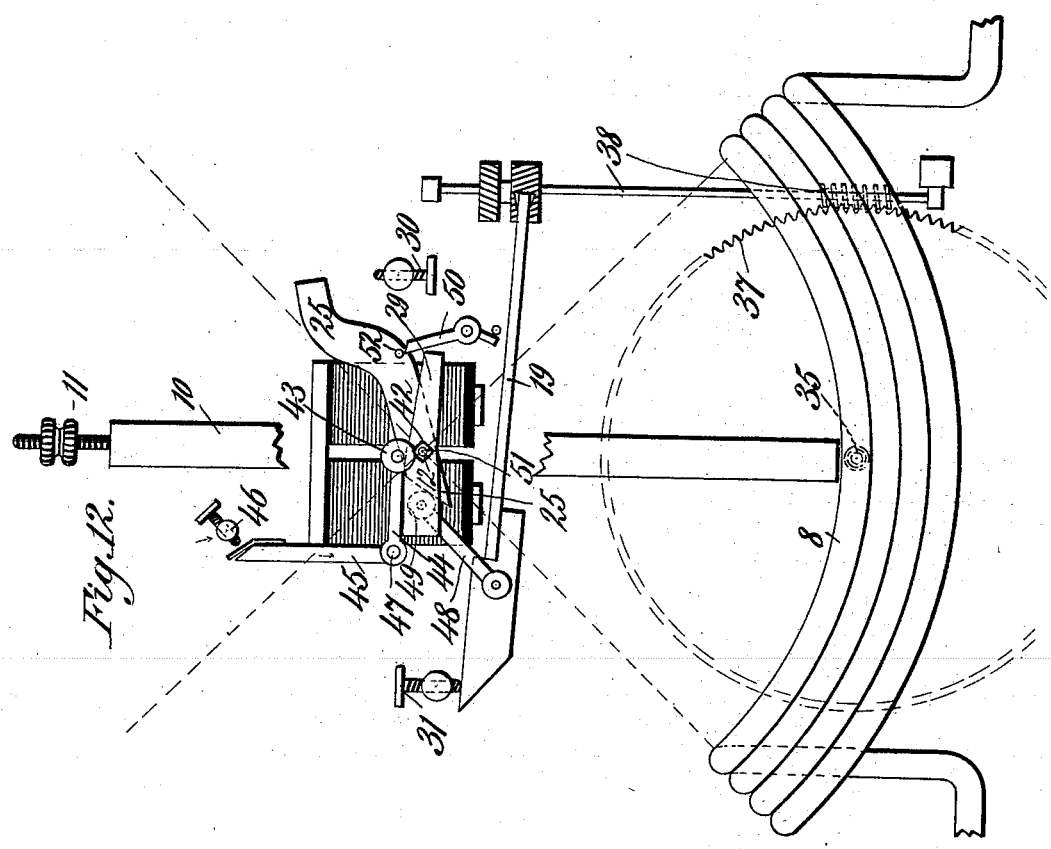
Figure 13:
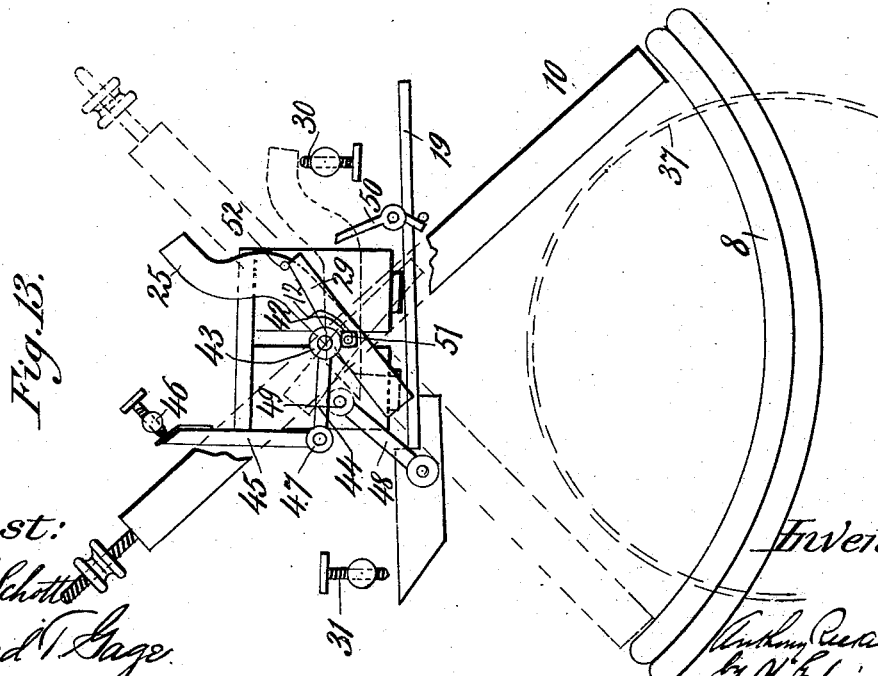
Figure 14:
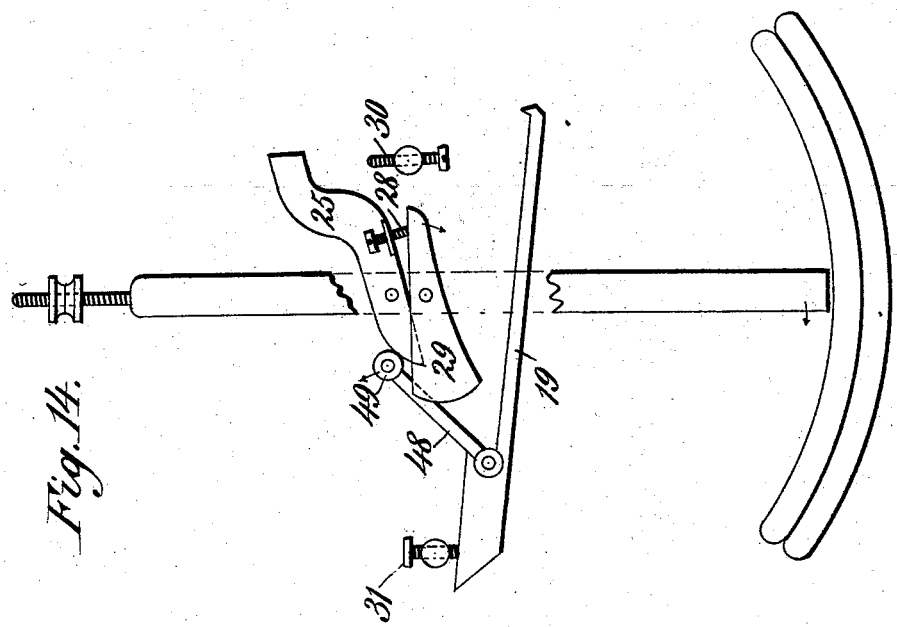

Figure 1 is a perspective of the meter with the dial removed; Fig. 2 a rear elevation. Fig. 3 is a partial vertical section on line 3—3 of Fig. 4. Fig. 4 is a plan view. Fig. 5 is a vertical section on line 5—5 of Fig. 4. Fig. 6 is a front elevation with casing in section; Fig. 7 a vertical cross section on line 7—7; Fig. 8 a vertical cross section, enlarged, of the needle bearing shown in Fig. 7. Fig. 9 is a bottom plan view, showing one resistance coil in section; Fig. 10 an elevation of the swinging gravity mechanism; Fig. 11 a similar view showing the oscillatory bar or beam in vertical position; Fig. 12 a partial elevation of another form of swinging gravity mechanism, showing the oscillatory beam in a vertical position; Fig. 13 a similar view, showing the oscillatory beam swung to one side; Fig. 14 a partial elevation of another form of swinging gravity mechanism, showing the oscillatory beam in a vertical position; and Fig. 15 a partial elevation, showing the oscillatory beam swung to one side.

Figure 15:
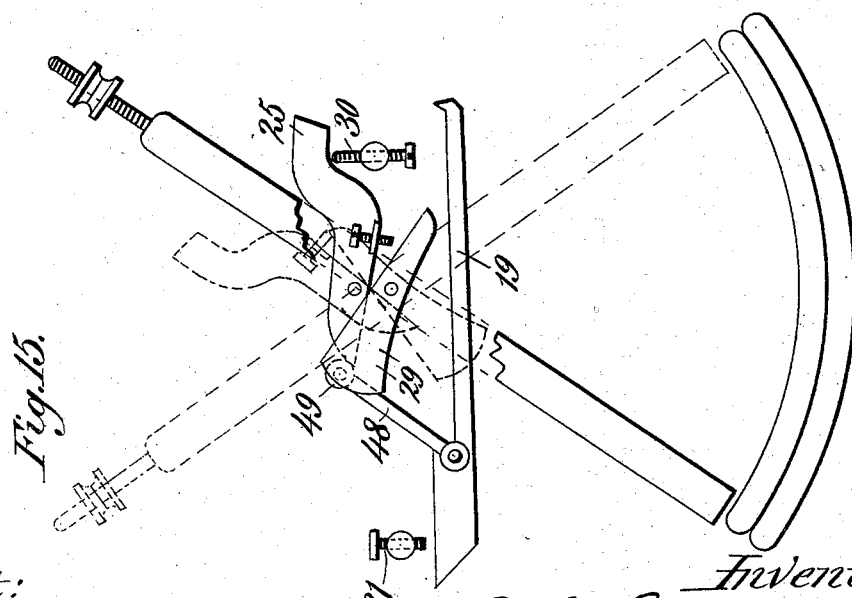

In Figs. 10, 13 and 15 the suspended bar or beam wherever shown in an inclined position illustrates the position of the bar in substantially its extreme movements, which position is an exaggeration of the inclined position it usually assumes under ordinary conditions.

My invention relates to certain improvements in that class of electrical measuring instruments in which the desired record or indication is obtained by influencing the rate of the oscillations of a suspended magnet or a solenoid, by means of a coil or coils placed in proximity thereto through which the electric currents to be measured pass.

The object of my invention is to obtain a record or indication of measurement without the use of ordinary clock work, pendulums or balance wheels, substituting therefor simpler and more reliable mechanisms.

In carrying my invention into effect, I employ a plurality of similar bars or beams suspended at a point preferably slightly out of their centers so that they may oscillate freely within a considerable arc. One of the said suspended bars or beams is of non-magnetic material, and the other is a bar magnet of about the same weight; they are similarly pivoted, each independently so that the oscillations may be synchronous when not influenced by external forces. These bars or beams are provided with appliances for maintaining oscillatory movements. The non-magnetic bar or beam is quite free at its lower extremity; the magnetic bar, however, swings with its lower end immersed in, or in close proximity to a coil preferably shaped to correspond to the radius described by the bar. The current to be measured passes through the coil and by its influence upon the oscillating bar magnet causes the speed or rate of oscillation to vary in a definite ratio to the strength of the current. It is obvious to the skilled in the art that for the bar magnet may be substituted a solenoid of fine wire wound upon a non-magnetic material. It is furthermore obvious that the influencing coil may be duplicated and placed in any convenient position near the upper end of the oscillating bar or beam. A small portion of the main current is sent through the high resistance coils of a suitable electro-magnet, attracting alternately a pivoted armature to which is attached the mechanism for starting the bar or beam, and the mechanism for registering the number of swings or oscillations in a given time. The principal purpose of the electro-magnet is to raise weights at a certain period of the oscillation of the beams and to release the weights so that by falling they impinge upon certain projections and afford an impulse at each oscillation and keep up the movement so long as there is any current to be measured. The bars cease swinging when the current in the main coil is entirely cut off. This method of employing a gravity impulse is arranged in such a manner that the free movement of oscillation of each bar or beam is not in any way impeded, and a suitable make and break or contact device is adapted to the mechanism for the purpose of raising the weight at the proper period of time during each oscillation. No reliance is placed upon electro-magnetism being a constant quantity, the impulses at a certain convenient period of a swing being due to the definite fall of a given weight, and the length of swing of the bar is not impeded by any mechanical resistance. The number of lifts of the armature is determined by the number of swings of the beam in a given time. By attaching to the armature, a counter the relative swings of each beam can be registered. Any kind of a speed counter may be applied.

Electricity meters have hitherto been constructed with pendulums driven by clock work. The lower end of one pendulum was provided with a magnet or shunt bobbin. These have serious disadvantages. The loose suspension of pendulums renders transport difficult without removing these parts and replacing them *in situ*. This means tampering with the internal arrangements, and precludes the possibility of sealing the instrument up when it leaves the manufacturer. Clock work is at all times liable to changes, due to temperature and other influences. I rely entirely upon gravity, and arrange the parts so that the beams oscillate freely and independently of all mechanical friction save that due to giving the impulse to the beams which swing through a considerable arc in a curve or straight coil as distinct from pendulums.

Having thus stated generally the features of my invention, the objects sought to be accomplished, and the disadvantages overcome, I will now proceed to describe more in detail different forms of mechanism for carrying my invention into effect.

In the drawings, the numeral 1 indicates the base of the meter which may be of any approved pattern and dimensions, which base supports a plate or block 2 upon which the frame of the meter is sustained, which frame 3 may be of any approved pattern. The upper portion of the frame is represented as supporting two disks 4 held together and apart from each other by transverse bars or posts 5, each of the two disks being illustrated as composed of a number of plates or layers separated from each other by some suitable non-conducting material, but the number of the plates or layers may be varied as desired. One of the disks is illustrated as having upon its two opposite faces plates 6 from each of which is supported two electro-magnets 7 which will have the coils of the two sets of magnets connected so that the current will pass from one set to the other and which will be connected in any well known way that may suggest itself to the skilled in the art with the main coil 8 or its equivalent which receives the current from the line, and which main coil or its equivalent may be located at any point that will serve the purpose hereinafter assigned to it. Each of these electro-magnets is designed to be periodically energized so as to periodically move an armature that will set into operation the mechanism for imparting impulses to the two oscillatory beams employed in the meter. As said mechanism is the same for each beam it will only be necessary to give a description of one of the mechanisms, which description will answer for both.

One of the oscillatory beams designated by the numeral 9 is of non-magnetic material, and the other designated by the numeral 10 is a bar magnet or may carry a magnet, and each may be provided with an adjusting nut or weight 11 regulating the swing of the beams as will be apparent to the skilled in the art. The two beams are about the same weight, and are both similarly pivoted, each independently of the other, so that the oscillations of the two may be synchronous when not influenced by external forces. The pivot pin of the beam 9 is designated by the numeral 12 which has suitable bearings 13 and 14 for its two ends, and the pivot pin of beam 10 is designated by the numeral 15 which has suitable bearings 16 and 17 as indicated. The pivot pins of the two beams are entirely distinct from each other so that the motion of one will not be communicated to the other; the inner bearings 13 and 17 being sustained by the brackets 18, which may be of suitable conducting material.

The means contemplated by my invention for imparting impulses to the two beams may be embodied in different forms, in connection with which, however, there is employed a make and break device or contact points in other words a circuit breaker which may also be embodied in different forms and arranged in different positions. In the different forms however there is employed an armature which is periodically moved by the electro-magnet so as to set the impulse imparting mechanism into action, the make and break device or contact points serving to periodically establish a current through the coil of the magnet so as to energize the magnet's coil to attract the armature to set the impulse operating mechanism into action. One form of such mechanism embraces the armature 19 suitably pivoted and having connected to it an arm which may consist of the two parts 20 and 21 jointed together, the part 21 being pivoted on a post 22 sustained at one end in the plate 6 and at the other end in the arm 23 supported from said plate, the free end of the part 21 having a pin 24 which supports in its normal position a weight 25 which may have its center of motion on a cross rod or pin 26 and which will carry from an extension 27 a point 28 with which will make contact an arm 29 connected to the pivot pin 12 of the beam so as to oscillate with the beam. The weight 25 and the arm 29 are free to turn on their center of movement independently of each other except when contact exists between the two when they will move together. The normal position of the weight 25 is an elevated one, and when the pin 24 is moved from under it the weight drops and being in contact with arm 29 presses the latter down so as to cause the beam to swing to one side. The pin is moved from under the weight 25 when the armature 19 is attracted by the electro-magnet which results when a portion of the current from the main coil passes through the electro-magnet say, through the arm 29 while said arm and the point sustained from the weight are in contact at the time that the weight is in its normal position shown in Fig. 11 of the drawings, the said arm and point constituting a make and break device. The impulse given to the arm 29 by the weight is sufficient to cause the beam to swing in the direction shown in full lines in Fig. 10 of the drawings after the weight has fallen to the limit of its downward movement which is controlled by the set screw 30. As soon as the contact is broken between the arm 29 and the point of the weight the electro-magnet becomes demagnetized and the armature 19 drops to its normal position (Fig. 11) and throws the pin 24 up against the weight 25 so as to raise it to its normal position, and on the return swing of the beam the arm 29 is brought into contact with the point 28 of the weight which again energizes the electro-magnet and causes the pin 24 to fall to the position shown in Fig. 10 of the drawings while the beam continues in its return swing in the direction shown by dotted lines in Fig. 10 of the drawing carrying with it the weight 25 toward the position shown by dotted lines in said figure, the arm and weight still being in contact so that when the two parts have reached the limit of their movement the weight will exert a downward pressure on the arm thus serving to press down the arm to cause the beam to swing in the other direction. This operation continues in alternation so long as there is any current passing through the meter to be measured. The upward throw of the part 21 of the arm connected to the armature will be limited by the set screw 31. The two beams cease to swing only when the current in the main coil is entirely cut off which is effected by an automatic switch designated by the numerals 32, 33 and 34 and shown in Fig. 11 of the drawing which is not specifically claimed in this application and therefore will not be more fully described, it being the same in principle as that described in the United States patent granted me November 24, 1891, No. 463,711.

The operation of the two beams is the same, but the passage of the current through the main coil under whose influence is the magnetic beam because of the position that it bears to the main coil, causes the rate of oscillation of the magnetic beam to be varied, while the movement of the non-magnetic beam remains constant. The difference, therefore, of the swings of the pair of beams is registered upon dials connected to a counting gear, and this is proportional with the current flowing through the main coil.

The means for indicating and registering the current consumed may be varied. I have illustrated suitable means for the purpose, the same consisting of a hollow shaft or sleeve 35 carrying a dial 36 and having a toothed wheel 37 to which motion is transmitted by a worm 38 at the end of which shaft is a ratchet 39 which is moved each time that the armature 19 is attracted by a pawl 40 which is connected at its upper end to the part 21 of the arm connected to said armature. Through this sleeve or shaft 35 passes a spindle 41 leading from the dial to a point on the side of the meter next to the magnetic bar 10 where it is provided with a toothed wheel 37 which receives motion from a worm 38 having the ratchet 39 at the end of its shaft with which engages a pawl 40 connected with the part 21 of the arm secured to the armature 19 so that it is actuated each time that the said armature is attracted. The spindle and the sleeve is partially revolved each time that its respective armature is actuated and the result is that when the oscillations of the beams are synchronous the index and dial are also synchronous and then no indication is effected; but as the passage of a current through the main coil causes the rate of oscillation of the magnetic bar to be varied, while the movement of the non-magnetic beam remains constant, the difference of the swings of the pair of beams is registered and this is proportional to the current flowing through the main coil.

Another form of mechanism for imparting the impulse to the beams and for effecting the make and break device is illustrated in Figs. 12 and 13 of the drawings. In Fig. 12 of the drawings the magnetic beam is represented when at its center of swing and when no current is flowing through the electro-magnets. In the position of the parts illustrated in Fig. 12 of the drawings, a cam 42 acting upon a roller 43 secured to a lever 44 has just lifted that lever and with it moved a lever 45 away from its contact terminal 46, which two levers are rigidly connected to a spindle 47 through which the current will be lead from the cam 42 serving as a terminal into the electro-magnet. Since the electric energy of this mechanism has been interrupted, the armature 19 has dropped and a link 48 attached to the armature has dropped with it. At the upper end of this link is a roller 49 striking the sloping end of the weight 25 which has its center of motion either upon the spindle 47 or at some other convenient point outside of the said spindle. But as shown in the drawings the spindle 47 is perfectly free to turn independently of the beam or bar, and the roller lifts the outer end of the weight 25 off of its set screw 30 and carries it to the position shown in Fig. 12 of the drawings. The pin 52 attached to this weight as it rises pushes the catch 50 to one side, which falls to its normal position after the pin has passed and is limited in its forward movement by the pin 52. As the upper end of the beam swings to the left, the cam 42 allows the roller 43 to fall when lever 45 makes contact with the terminal 46 and closes the circuit for the armature 19 to be attracted, when the roller 49 on the end of the link 48 is lifted off the weight 25 which then falls by gravity until the pin 52 bears against catch 50. The arm 29 which is part of the spindle 51 lifts the weight 25 as soon as the beam has moved far enough to cause said arm to engage the pin 52 on the weight. For a moment the weight 25 and the arm 29 move together and when the beam commences its return swing the weight and the arm drop together, the arm striking the catch 50 and moving it so as to allow the pin 52 to pass until the weight 25 strikes the set screw 30. All of this occurs in a second or a fraction of a second, according to the time allowed for a complete oscillation. The downward movement of the armature 19 is limited by the set screw 31, in this instance being placed to the rear of the fulcrum or pivotal point of the armature instead of as shown in Figs. 10 and 11 of the drawings. The operation of these parts is the same in result as the construction shown in Figs. 1 to 11 of the drawings. The movement of the armature 19 is transmitted to the toothed wheel 37 of the registering dial through the worm shaft 38, which shaft is shown in Fig. 12 as in an upright position and to which motion is communicated from the armature 19 by any suitable connection which may suggest itself to the mechanic. The positions of the beam at the limit of its two extreme swings are indicated in Figs 13 of the drawings by full and dotted lines, and the position of the other moving parts are likewise indicated. Only so much of the parts necessary to an understanding of the construction and arrangement of the form illustrated in Figs. 12 and 13 is shown as will indicate those changes, the details of the connections of these parts to the other part of the meter being omitted as the same will readily occur to the skilled in the art in the light of the description given of the form first described.

Another form of contact making and breaking device is illustrated in Figs. 14 and 15 of the drawings. In this form the arm 29 is insulated from the frame work and also serves to lead the current into the coils of the electro-magnets as well as to receive the impulse of the weight 25, the latter being provided with the point 28 to make contact with the arm 29 as in the form first described. In this present form, when the beam is at rest the contact point 28 of the weight 25 touches the arm 29, the weight 25 occupying a certain position by virtue of the roller 49 on the link 48 resting upon the inner arm of the weight 25 as indicated, this position being definitely determined by the set screw 31. It will be seen at the moment the current is turned on, the electro-magnet will be energized and lift its armature 19, and with it the link 48 and roller 49 and thus releasing the weight 25 will allow it to act upon the beam through the arm 29 until the weight strikes the set screw 30, the beam continuing its motion and carrying the arm 29 with it as indicated in Fig. 15 of the drawings, thus breaking the contact and allowing armature 19 to fall and the roller 49 to strike the inner end of the weight 25 when the weight will be again lifted to its normal position indicated in Fig. 14 of the drawings. On the return swing of the beam, contact between the arm 29 and point 28 is again made and the circuit established, the arm 29 and the weight 25 being at the same time moved upward as indicated by dotted lines in Fig. 15 of the drawings. When the beam makes its return swing the parts are again brought to the position shown by whole lines in Fig. 15 of the drawings and the circuit broken. This operation is repeated during the entire time the meter is operated. The center of motion of the arm 29 and of the weight 25 may be, as shown, out of coincidence, the effect being to give a small amount of sliding motion of the contact point 28 on the arm 29 so as to keep the contact surface clean and insure good electrical connections. I have omitted from Figs. 14 and 15 all parts of the device except such as are necessary to illustrate this particular form of make and break device; the other parts can be readily supplied by the skilled in the art in the light of the description first given of the invention.

I have illustrated in Figs. 7 and 9 a resistance coil 53 as contained in the base of the meter; and I have also illustrated in various figures of the drawings connections that will serve to establish a shunt circuit and the circuit through the meter, but as these may be varied indefinitely as will occur to the skilled in the art and involve no invention, I refrain from giving any detailed description thereof as the same would only lead to unnecessary prolixity in the description. It will also be obvious to the skilled in the art that insulations may be employed wherever found desirable, which will occur to the skilled in the art.

I have given an illustration of three forms of application of my invention for the purpose of illustrating some instances as to how the same may be varied, and to indicate that my invention is not confined to particular details of construction and arrangements of parts.

In order that the oscillatory beams or bars may be held against movement during transport, I provide on the inside of the case of the inclosing case at the top an elastic strip or bar 54 adapted to bear against the upper ends of both beams or bars as illustrated in Fig. 7 of the drawings, the said strip or bar being provided with a threaded bolt or pin 55 which extends through the top of the case and to which is applied a thumb nut 56, so that by turning said nut the elastic strip or bar can be lowered so as to bear against the end of the oscillatory beams or bars to hold them rigid, or by turning the nut in the other direction said elastic strip will be raised from contact with the beams or bars. Pins 57 may be provided to extend from the top of the case and through said elastic strip so as to hold it against lateral or side movement. Any other form of device than that just described that will serve the same purposes may be employed.

Having described my invention and set forth its merits, what I claim is—

1. In an electric meter, having a registering device and an automatic make and break device, an oscillatory bar or beam suspended centrally or substantially centrally and operating to actuate said make and break device in its oscillations a non-magnetically acting device for imparting an impulse to said bar or beam, and mechanism influenced by the current passing through the meter to operate said registering device, substantially as and for the purposes described.

2. In an electric meter having oscillating bars or beams one of which is under the influence of the current passing through the meter and the other is not, and means for registering the difference in the oscillations of the said bars or beams, of a definite weight adapted to move a definite distance to impart an impulse to said bars or beams, substantially as and for the purposes described.

3. In an electric meter having a registering device and an automatic make and break device, an oscillatory bar or beam suspended centrally or substantially centrally and operating to actuate said make and break device in its oscillations, a gravity device for imparting motion to said oscillatory beam or bar, and mechanism influenced by the current passing through the meter to operate said registering device, substantially as and for the purposes described.

4. In an electric meter having a registering device and an automatic make and break device, an oscillatory bar or beam operating to actuate said make and break device in its oscillations, a gravity device for imparting motion to said oscillatory bar or beam, means for sustaining said gravity device in its normal position, mechanism for moving said sustaining means to permit the gravity device to transmit motion to said beam or bar, said mechanism being actuated by the current passing through the meter, and mechanism influenced by the current passing through the meter to operate said registering device, substantially as and for the purposes described.

5. In an electric meter having a registering device and an automatic make and break device, an oscillatory bar or beam operating to actuate said make and break device in its oscillations, a gravity device for imparting motion to said oscillatory bar or beam, means for sustaining said gravity device in its normal position, mechanism for moving said sustaining means to permit the gravity device to transmit motion to said beam or bar when a current is passing through the meter and said make and break device has made circuit, said mechanism also serving to restore said gravity device to its normal position after the circuit is broken, and mechanism influenced by the current passing through the meter to operate said registering device, substantially as and for the purposes described.

6. In an electric meter having a registering device and an automatic make and break device, an oscillatory bar or beam, a gravity device for imparting motion to said bar or beam, means for sustaining said gravity device in its normal position, said gravity device being connected with said oscillatory bar or beam so as to transmit motion thereto upon its sustaining means being moved to permit it to act thereon, and mechanism for moving said sustaining means when a current is passing through the meter and the circuit is established, substantially as and for the purposes described.

7. In an electric meter having a registering device and an automatic make and break device, an oscillatory bar or beam operating to actuate said make and break device in its oscillations, an arm connected with said oscillatory beam or bar, and a gravity device for transmitting motion to said bar or beam through said arm and sustained independently of said arm, substantially as and for the purposes described.

8. In an electric meter, the combination with an oscillatory bar or beam suspended centrally or substantially centrally, and under the influence of the electric current to be measured to have its oscillations affected thereby, of a second oscillatory bar or beam uninfluenced by the current to be measured and suspended centrally, or substantially centrally, said beams operating synchronously when no current to be measured is passing through the main coil, while when the current is passing through said coil the rate of oscillation of the magnet bar varies and the movements of the other bar remain constant, and means for registering the difference in the oscillations of the bars, substantially as and for the purposes described.

9. In an electric meter, the combination of an oscillatory bar or beam suspended centrally, or substantially centrally, and under the influence of the current to be measured, a second oscillatory bar or beam uninfluenced by the current to be measured and suspended centrally, or substantially centrally, and independent of the first mentioned bar or beam, said beams oscillating synchronously when no current to be measured is passing through the main coil, automatic make and break devices, actuated by said oscillatory beams, gravity devices for imparting motion to said oscillatory bars or beams, means for sustaining said gravity devices in their normal positions, mechanism for moving said sustaining means to permit the gravity devices to transmit motion to said beams or bars when a current is passing through the meter and said make and break devices have made circuit, and means for registering the difference in the oscillations of the bars or beams, substantially as and for the purposes described.

10. In an electric meter, the combination of an oscillatory bar or beam suspended centrally, or substantially centrally, and under the influence of the current to be measured, a second oscillatory bar or beam uninfluenced by the current to be measured and suspended centrally, or substantially centrally, and independently of the first mentioned bar or beam, said bars or beams oscillating synchronously when no current to be measured is passing through the main coil, automatic make and break devices actuated by said oscillatory beams, gravity devices for imparting motion to said oscillatory bars or beams, means for sustaining said gravity devices in their normal positions, mechanism for moving said sustaining means to permit the gravity devices to transmit motion to said bars or beams when a current is passing through the meter and said make and break devices have made circuit, means for registering the difference in the oscillations of the bars or beams, and a case inclosing said several devices and sealed to prevent tampering with the devices, substantially as and for the purposes described.

In testimony whereof I affix my signature in presence of two witnesses.

ANTHONY RECKENZAUN.

Witnesses:
P. STANLEY,
T. F. BARNES.